(12) United States Patent
Jain (10) Patent No.: US 8,416,237 B1
(45) Date of Patent: Apr. 9, 2013

(54) PERSPECTIVE AWARE AUTOMATIC GUIDE GENERATION (75) Inventor: Gaurav Jain, Vidisha (IN)

(73) Assignee: Adobe Systems Incorporated, San Jose, CA (US)

( * ) Notice: Subject to any disclaimer, the term of this patent is extended or adjusted under 35 U.S.C. 154(b) by 846 days.

(21) Appl. No.: 12/554,068

(22) Filed: Sep. 4, 2009

(51) Int. Cl.
*G06T 17/00* (2006.01)

(52) U.S. Cl.
USPC .......................................................... 345/420

(58) Field of Classification Search ................... None
See application file for complete search history.

(56) References Cited

U.S. PATENT DOCUMENTS

| 5,490,241 | A | * | 2/1996 | Mallgren et al. | 345/440 |
|---|---|---|---|---|---|
| 5,870,099 | A | * | 2/1999 | Horii et al. | 345/427 |
| 6,046,745 | A | * | 4/2000 | Moriya et al. | 345/420 |
| 6,628,279 | B1 | * | 9/2003 | Schell et al. | 345/420 |
| 6,771,276 | B1 | * | 8/2004 | Highsmith et al. | 345/619 |
| 2005/0204575 | A1 | * | 9/2005 | Rosetti | 33/760 |

* cited by examiner

*Primary Examiner* — Edward Martello
(74) *Attorney, Agent, or Firm* — Kilpatrick Townsend & Stockton LLP (57) ABSTRACT

Methods and apparatus provide for a perspective guide. The perspective guide identifies a first object displayed on a graphical user interface rendered on a display device. An edge of the first object includes an anchor point. The anchor point is positioned on a vector that extends from the vanishing point towards the anchor point, where the predefined vanishing point is placed in a perspective drawing on the graphical user interface. The perspective guide associates a graphical pointer to the anchor point, and the perspective guide draws a new object relative to the anchor point on the graphical user interface while maintaining at least one edge of the new object in forced perspective alignment with the vector.

20 Claims, 9 Drawing Sheets

PERSPECTIVE AWARE AUTOMATIC GUIDE GENERATION

BACKGROUND

Conventional computerized devices, such as personal computers, laptop computers, and the like utilize a graphical user interface in applications, such as operating systems, and graphical editors (i.e., web page editors, document editors, etc.) that enable users to quickly provide input and create documents and/or projects using "What You See Is What You Get" (WYSIWYG) technology. In general, using a graphical user interface, a user operates an input device such as a mouse or keyboard to manipulate graphical objects on a computer display. The user can operate an input device such as a mouse to move a mouse pointer onto a graphical object—or create a graphical object in a graphics editor application.

Certain conventional software applications operate within a computer system to allow users to create or draw and edit graphical images of various things. As an example, Computer Aided Design (CAD) software systems allow users to create drawings and designs of buildings or other objects. When using such graphics editor applications, as a user presses down on a mouse button and drags the mouse pointer over a canvas displayed by the graphics editor application, the graphics editor application creates and places a graphical object on the graphics editor application's canvas. The user can place multiple graphical objects on the canvas and the graphics editor application provides selectable functionalities that allow for modifying various attributes of a graphical object, such as color, shading, line weight, line style, object size, object style and the layout of the graphical objects currently displayed on the canvas.

BRIEF DESCRIPTION

Current graphics editor applications suffer from a variety of deficiencies. As an example, conventional graphics editor applications do not enable easy creation of multiple objects in perspective view to each other in a simple manner such that sizes of those objects, including sizes and alignments of those object edges, are maintained in perspective with each other. Perspective drawings are drawings in two dimensions that have objects in an approximate representation in the drawing with each other as though they are perceived by a human eye when viewing the drawing. As an example, if a roadway appears in a perspective drawing, the sides of the roadway converge to a common vanishing point that appears in the distance on a horizon line (imaginary or displayed) in the drawing. As another example, in a perspective drawing, parallel lines of objects in perspective drawings, such as tops and bottoms of buildings, windows and doorways, all have lines that are directed towards one or more common vanishing points. When attempting to draw an object in a conventional graphics editor application, such applications do not provide features to enable fully accurate representations of, for example, tops or bottoms of objects while maintaining those tops and bottoms in perspective and aligned view with each other between more than one object.

More specifically, current graphics editor applications do not display temporary guidelines sloped towards a vanishing point defined on a canvas. For example, if a user wishes to create a new object with an edge rendered in perspective with a vanishing point, current graphics editor applications do not provide guidelines sloped towards the vanishing point in order to assist the user in determining a desirable starting point for the edge—such that the new object's edge will be rendered at an angle sloped towards the vanishing point and such that the new object edge will be maintained in alignment with a previously draw objects edge. As an example, if a user of a conventional graphics editor application draws a first object such as a window in perspective view, when drawing a second window in the same figure, conventional graphics editor applications do not provide mechanisms to maintain proper perspective alignment of the edges of the new window based on a reference of the already existing window that was originally drawn in perspective.

Techniques discussed herein significantly overcome the deficiencies of conventional graphics editor applications such as those discussed above. As will be discussed further, certain specific embodiments herein are directed to a perspective guide.

Generally, the techniques disclosed herein provide a computer system and/or software in the form of a perspective guide (e.g. such as a feature within a graphics editor application) that easily allows a user to create or draw a new object on a graphical user interface in perspective within a graphical editor application. During creation of the new object, the perspective guide described herein will maintain the new object in proper perspective alignment based on a reference to another object in the drawing that has already been drawn in perspective towards at least one vanishing point on a horizon. In this manner, the perspective guide system described herein simplifies and speeds up the process of creation of multiple objects that must be drawn in perspective with each other.

Specifically, in various embodiments, a computer implemented system, methods and apparatus provide a perspective guide that identifies a first object displayed on a graphical user interface (G.U.I.) rendered on a display device. An edge of the first object includes an anchor point. The anchor point is positioned on a vector that extends from a predefined vanishing point towards the anchor point, where the predefined vanishing point is placed in a perspective drawing (such as a perspective two-dimensional drawing with multiple vanishing points placed on a horizon line) on the G.U.I. The perspective guide associates a graphical pointer to the anchor point and the perspective guide draws a new object relative to the anchor point on the G.U.I. while maintaining an edge of the new object in forced perspective alignment with the vector.

Thus, unlike current graphics editor applications, the perspective guide displays a temporary guideline connected to the anchor point as the graphical pointer moves about the canvas of the G.U.I. The perspective guide displays the temporary guideline when the mouse pointer's current position is near the vector that starts from the vanishing point and extends towards the anchor point. The temporary guideline acts as a visual cue informing the user that the mouse pointer's current position is near a desirable starting point for an edge of a new object such that the edge will be rendered in perspective alignment with the vanishing point.

For example, a user wishes to create a new object on a canvas that already displays multiple objects with edges in line with a hidden vector that extends from a particular vanishing point. Thus, the edges of the multiple objects are angled (i.e. sloped) towards the vanishing point. The user selects an anchor point on an edge of a currently displayed object that is angled towards the vanishing point.

As the user drags the mouse pointer (i.e. graphical pointer, user-controlled prompt, etc.) on the canvas to select a starting point for an edge of the new object, the perspective guide displays a temporary guideline when the mouse pointer moves in proximity to the vector that extends from the vanishing point. The temporary guideline starts from the anchor point to a position on the vector that is closest to a current position of the mouse pointer. In some embodiments, the vector extends from the anchor point towards the vanishing point.

It is understood that, in various embodiments, the graphical pointer need not be dragged directly along the vector for the perspective guide to effect display of the temporary guideline. Rather, once the perspective guide detects that the graphical pointer is currently placed within a given range of distance from a particular coordinate on the vector, the perspective guide displays the temporary guideline running from the anchor point to the particular coordinate in order to guide the user's operation of the graphical pointer towards selecting an edge's starting point on the vector.

Thus, as the user searches for a place on the canvas to start creating the new object, the perspective guide displays the temporary guideline to inform the user that the mouse pointer's current position on the canvas is near a position on the vector that could be a starting point for an edge that is in perspective and in alignment with the anchor point from where the temporary guideline originated.

When the user clicks the mouse while the perspective guide displays the temporary guideline, the guideline end becomes the starting point for the new object's edge—even though the graphical pointer is not currently positioned along the vector. When the perspective guide renders the new object in the G.U.I., the perspective guide the edge of the object will be rendered along the vector such that the rendered edge is in perspective with the vanishing point.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium (e.g., tangible computer-readable medium) including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in software and hardware such as those manufactured by Adobe Systems Incorporated of San Jose, Calif., U.S.A., herein after referred to as "Adobe" and "Adobe Systems."

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note also that this Brief Description section herein does not specify every embodiment and/or incrementally novel aspect of the present disclosure or claimed invention. Instead, this Brief Description only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below.

BRIEF DESCRIPTION OF THE DRAWINGS

The foregoing and other objects, features and advantages of the invention will be apparent from the following more particular description of embodiments of the methods and apparatus for a perspective guide, as illustrated in the accompanying drawings and figures in which like reference characters refer to the same parts throughout the different views. The drawings are not necessarily to scale, with emphasis instead being placed upon illustrating the embodiments, principles and concepts of the methods and apparatus in accordance with the invention.

DETAILED DESCRIPTION

Generally, the techniques disclosed herein provide a computer system and/or software in the form of a perspective guide (e.g. such as a feature within a graphics editor application) that easily allows a user to create a new object in perspective within a graphical editor application. During creation of the new object, the perspective guide described herein will maintain the new object in proper perspective alignment based on a reference to another object in the drawing that has already been drawn in perspective towards at least one vanishing point on an horizon line. In this manner, the perspective guide system described herein simplifies and speeds up the process of creation of multiple objects that must be drawn in perspective with each other.

FIGS. 1, 3, 5 and 7 illustrate flowcharts of processing of various embodiment of the perspective guide 150. FIGS. 2, 4, 6 and 8 show examples of block diagrams illustrating a graphical user interface that demonstrates the processing described in the flowcharts. The rectangular elements in flowcharts 100, 300, 500 and 700 (in FIGS. 1, 3, 5 and 7) denote "processing blocks" and represent computer software instructions or groups of instructions upon a computer readable medium. Additionally, the processing blocks represent steps performed by hardware such as a computer, digital signal processor circuit, application specific integrated circuit (ASIC), etc. As the processing in the flowcharts is described, reference will be made to FIGS. 2, 4, 6 and 8 that show examples of this processing.

Flowcharts 100, 300, 500 and 700 do not necessarily depict the syntax of any particular programming language. Rather, flowcharts 100, 300, 500 and 700 illustrate the functional information one of ordinary skill in the art requires to fabricate circuits or to generate computer software to perform the processing required in accordance with the present invention.

It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order.

Figure 1:
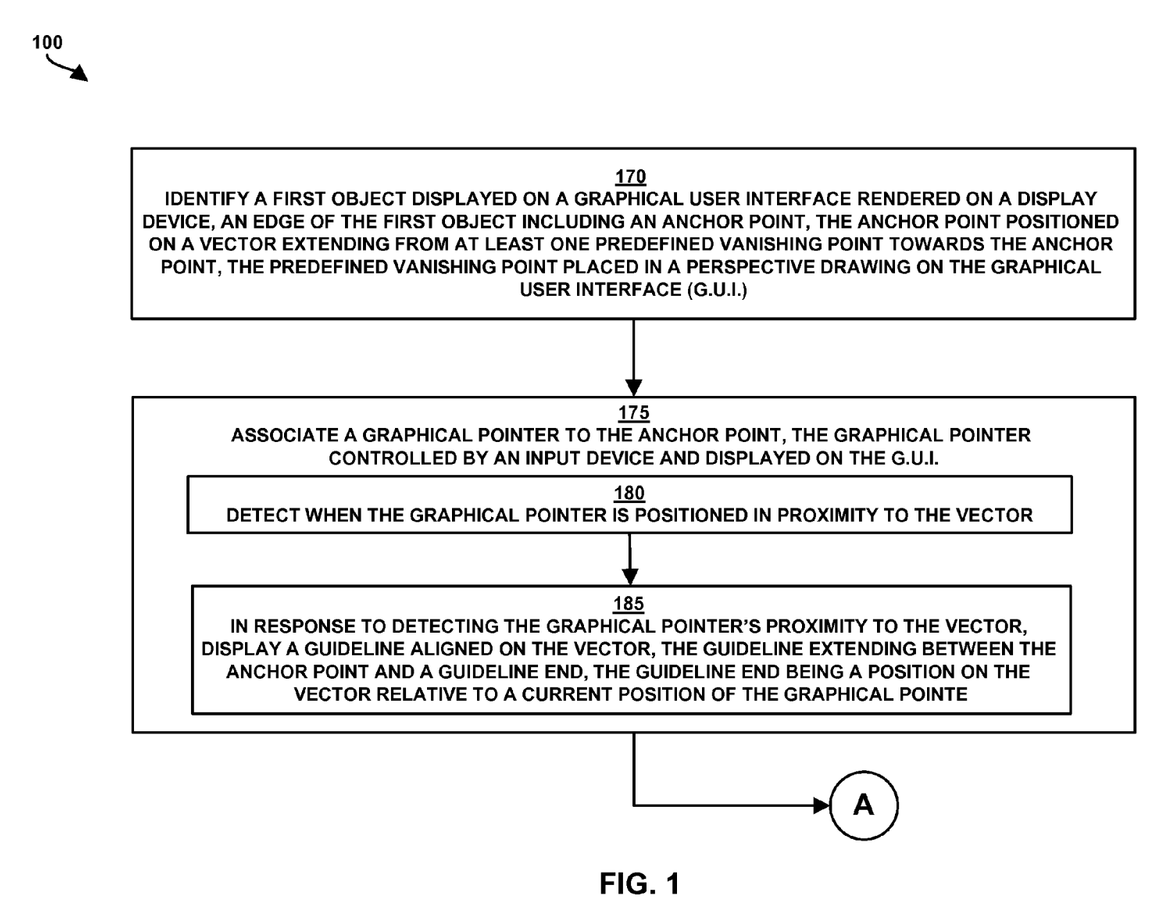
FIG. 1 is a flowchart of an example of processing steps performed by a perspective guide to associate a graphical pointer with an anchor point according to embodiments herein.
Figure 2:
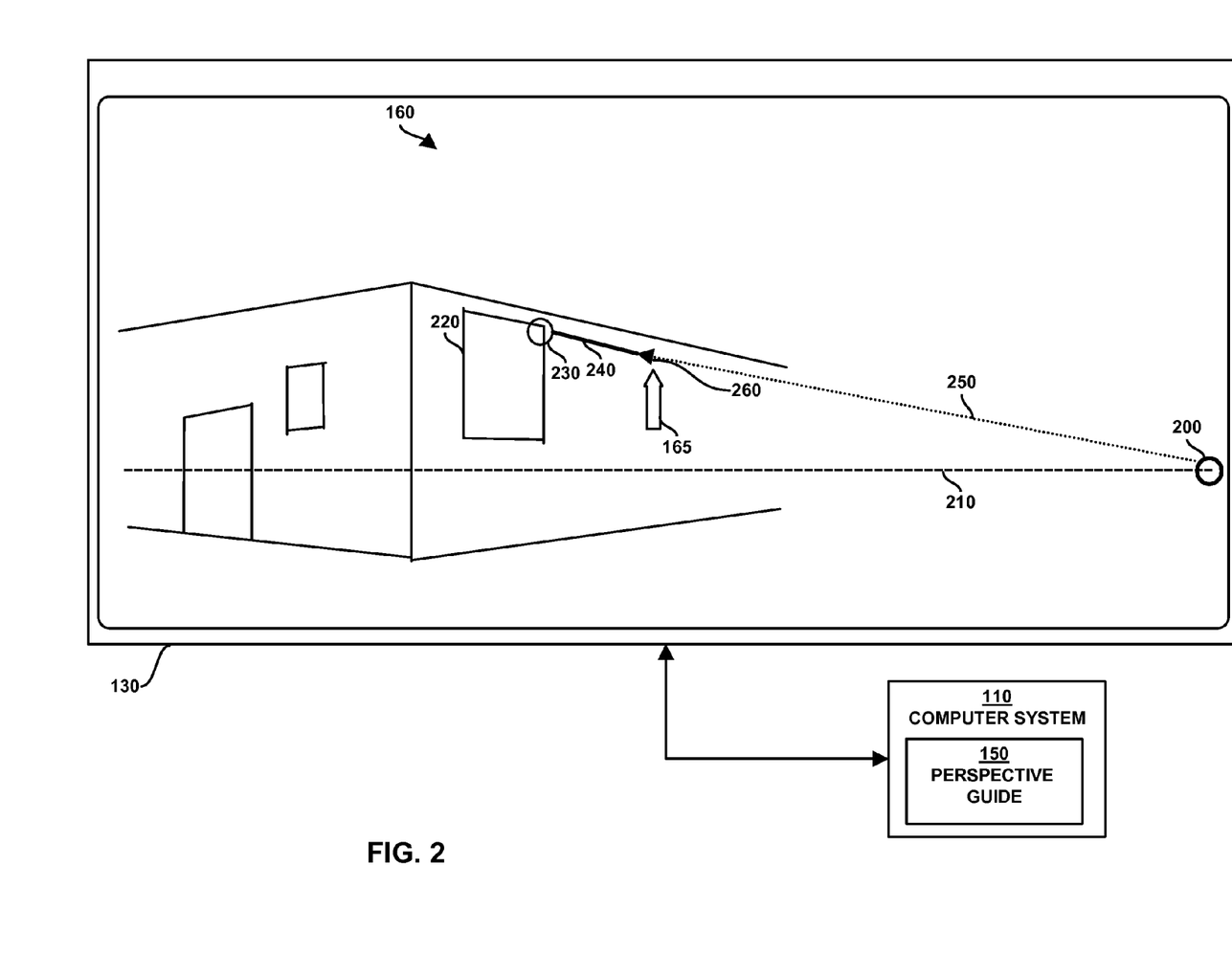
FIG. 2 is an example block diagram of a perspective guide displaying a guideline aligned on a vector according to embodiments herein.

FIG. 1 is a flowchart 100 of an example of processing steps performed by a perspective guide 150 to associate a graphical pointer with an anchor point according to embodiments herein. The processing steps discussed in FIG. 1 relate generally to the block diagram illustrated in FIG. 2. FIG. 2 is an example block diagram of the perspective guide 150 displaying a guideline aligned on a vector according to embodiments herein.

A computer system 110 receives operations of an input device 116 (such as a computer mouse) and executes the perspective guide 150 in order to render graphics with respect to the input device operations in a G.U.I. 160 presented on a display 130 associated with the computer system 110.

At step 170, the perspective guide 150 identifies a first object 220 displayed on the G.U.I. 160. An edge of the first object 220 includes an anchor point 230, where the anchor point is positioned on a vector 250 that extends from a predefined vanishing point 200 towards the anchor point 230. The predefined vanishing point 200 is placed on a horizon 210 in a perspective drawing (such as a two-vanishing point, two-dimensional drawing) on the G.U.I. 160. It is noted that in some embodiments, the vector 250 is hidden from view on the G.U.I. 160, so that the perspective guide 150 displays only the a temporary guideline 240 as the graphical pointer 165 moves within a range of proximity to the a coordinate on the vector 250.

At step 175, the perspective guide 150 associates a graphical pointer 165 to the anchor point 230. At step 180, the perspective guide 150 detects when the graphical pointer 165 is positioned in proximity to the vector 250. For example, the perspective guide 150 detects when the graphical pointer 165 is positioned slightly above or slightly below a coordinate on the G.U.I. 160 positioned along the vector 250.

At step 185, in response to detecting the graphical pointer's 165 proximity to the vector 250, the perspective guide 150 displays a temporary guideline 240 aligned on the vector 250. The guideline 240 extends between the anchor point 230 and a guideline end 260, where the guideline end 260 is a position on the vector 250 relative to a current position of the graphical pointer 165. For example, in various embodiments, the guideline end 260 can be a position along the vector 250 that is nearest to a current position of the graphical pointer 165 when the perspective guide 150 detects the graphical pointer 165 is within a given range of proximity to the vector 250.

In one embodiment, the perspective guide 150 displays the guideline 240 as a graphical shape (such as a graphical line) that is visually distinct from the visual edge characteristics of the first object 220.

In yet another embodiment, the vector 250 is hidden from view on the G.U.I. 160 by the perspective guide 150. However, upon receiving a request to reveal the vector 250, the perspective guide displays the vector 250 in the G.U.I. as visually distinct from both (i) the visual characteristics of the guideline 240 and (ii) the visual characteristics of the first object. Thus, a user viewing the G.U.I. will be able to easily visually distinguish between the first object 220, the guideline 240 (i.e. temporary guideline), and the displayed vector 250.

Figure 3:
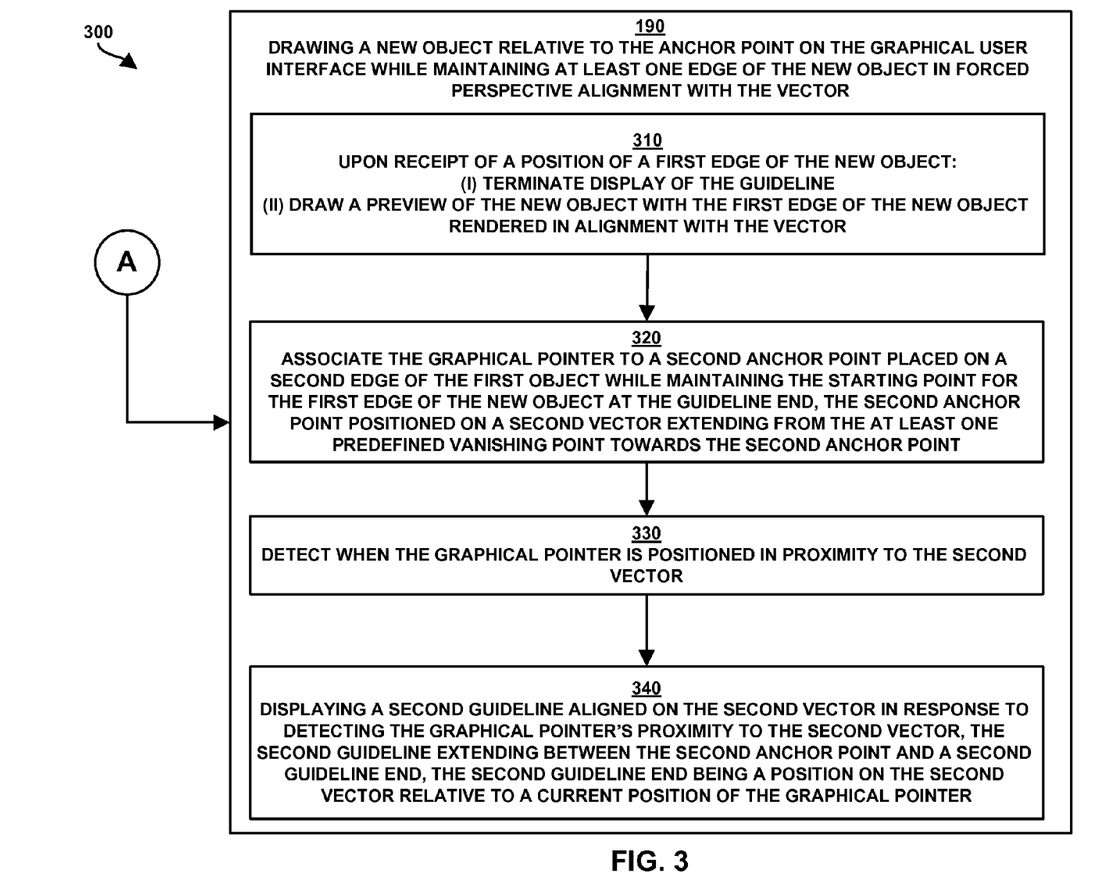
FIG. 3 is a flowchart of an example of processing steps performed by a perspective guide to draw a new object relative to a anchor point on a graphical user interface while maintaining an edge of the new object in forced perspective alignment with a vector according to embodiments herein.
Figure 4:
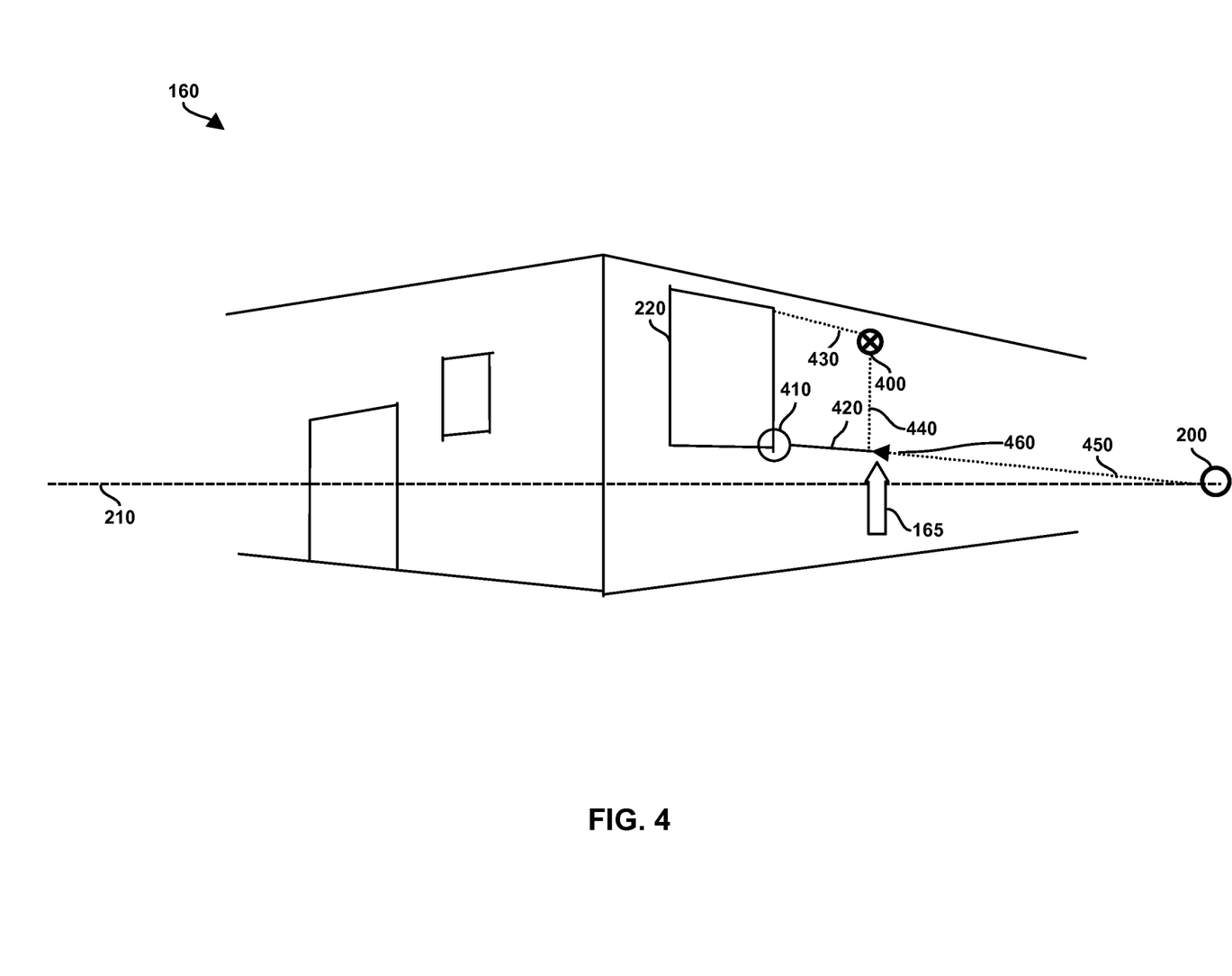
FIG. 4 is an example block diagram of a perspective guide displaying a second guideline aligned on a second vector according to embodiments herein.

FIG. 3 is a flowchart 300 of an example of processing steps performed by the perspective guide 150 to draw a new object relative to the anchor point on the graphical user interface while maintaining an edge of the new object in forced perspective alignment with a vector according to embodiments herein. The processing steps discussed in FIG. 3 relate generally to the block diagram illustrated in FIG. 4. FIG. 4 is an example block diagram of a perspective guide 150 displaying a second guideline aligned on a second vector according to embodiments herein. In one embodiment, when the perspective guide 150 maintains an edge of a new object in forced perspective alignment with a vector at the starting point of the new object. In other embodiments, the edge of the new object can be one or more locations on the edge of the new object. Thus, for purposes of this document, in some embodiments, an "edge" can merely be interpreted as a starting point or end point of a segment of a graphical object.

At step 190, the perspective guide 150 draws a new object relative to the anchor point 230 on the G.U.I. 160 while maintaining an edge of the new object in forced perspective alignment with a vector 250. In one embodiment, during display of the guideline 240, the perspective guide 150 receives selection of a starting point 400 for an edge of the new object. The perspective guide 150 defines the starting point 400 for the edge of the new object at the guideline end 260. In response to defining the starting point 400, the perspective guide 150 terminates display of the temporary guideline 240. In various embodiments, it is understood that the perspective guide 150 draws objects (and other graphics and graphical objects) in response to (and based on) user input provided via an input device.

Additionally, when the perspective guide 150 detects selection of the starting point 400, the perspective guide 150 draws a preview of the new object, which will have edges 420, 430, 440 which will each have respective positions based on where the user subsequently drags the graphical pointer 165 on the G.U.I. 160. However, once the starting point 400 is selected, the preview of the new object includes an edge 430 that emanates from the starting point 400 and lies on the vector 250 sloped towards the vanishing point.

In yet another embodiment, at step 310, (as illustrated in FIG. 4) upon receipt of a position of a first edge of the new object, the perspective guide 150 terminates display of the guideline 240 and draws a preview of the new object with the first edge 430 of the new object rendered in alignment with the vector 250.

At step 320, the perspective guide 150 associates the graphical pointer 165 to a second anchor point 410 placed on a second edge of the first object 220 while maintaining the starting point 400 for the first edge 430 of the new object at the guideline end. The second anchor point 410 is positioned on a second vector 450 that extends from the predefined vanishing point 200 towards the second anchor point 410.

At step 330, as the graphical pointer 165 moves away from the second anchor point 410, the perspective guide 150 detects when the graphical pointer 165 is positioned in proximity to the second vector 450. For example, the perspective guide 150 monitors the graphical pointer 165 current position to determine whether the graphical pointer's 165 current position falls within a predefined range of G.U.I. coordinates away from a position on the second vector 450.

At step 340, in response to detecting the graphical pointer's 165 proximity to the second vector 450, the perspective guide 150 displays a second guideline 420 aligned on the second vector 450. The second guideline 420 extends between the second anchor point 410 and a second guideline end 460. The second guideline end 460 is a position on the second vector 450 relative to a current position of the graphical pointer 165.

For example, when the perspective guide 150 detects the G.U.I. coordinates that represent the graphical pointer's 165 current position fall within the predefined range of G.U.I. coordinates, the perspective guide 150 selects a position along the vector as the second guideline end 460. The perspective guide 150 selects the second guideline end 460 as a G.U.I. coordinate on the vector nearest to the G.U.I. coordinates that represent the graphical pointer's 165 current position.

As further illustrated in FIG. 4, the perspective guide 150 draws a preview of the new object as the graphical pointer 165 moves towards the first object 220 for selection of the second anchor point 410 and as the graphical pointer moves away from first object 220. The perspective guide 150 thereby displays the preview of the new object with an edge 430 that includes the starting point 400, where the edge 430 is sloped according to the perspective of the vanishing point 200. Even though the user has not selected the final (i.e. desired) dimensions and placement of the new object, the preview of the new object also has an edge 420 that includes the second anchor point 410 and an edge 440 between the starting point 400 and the second guideline end 460.

Figure 5:
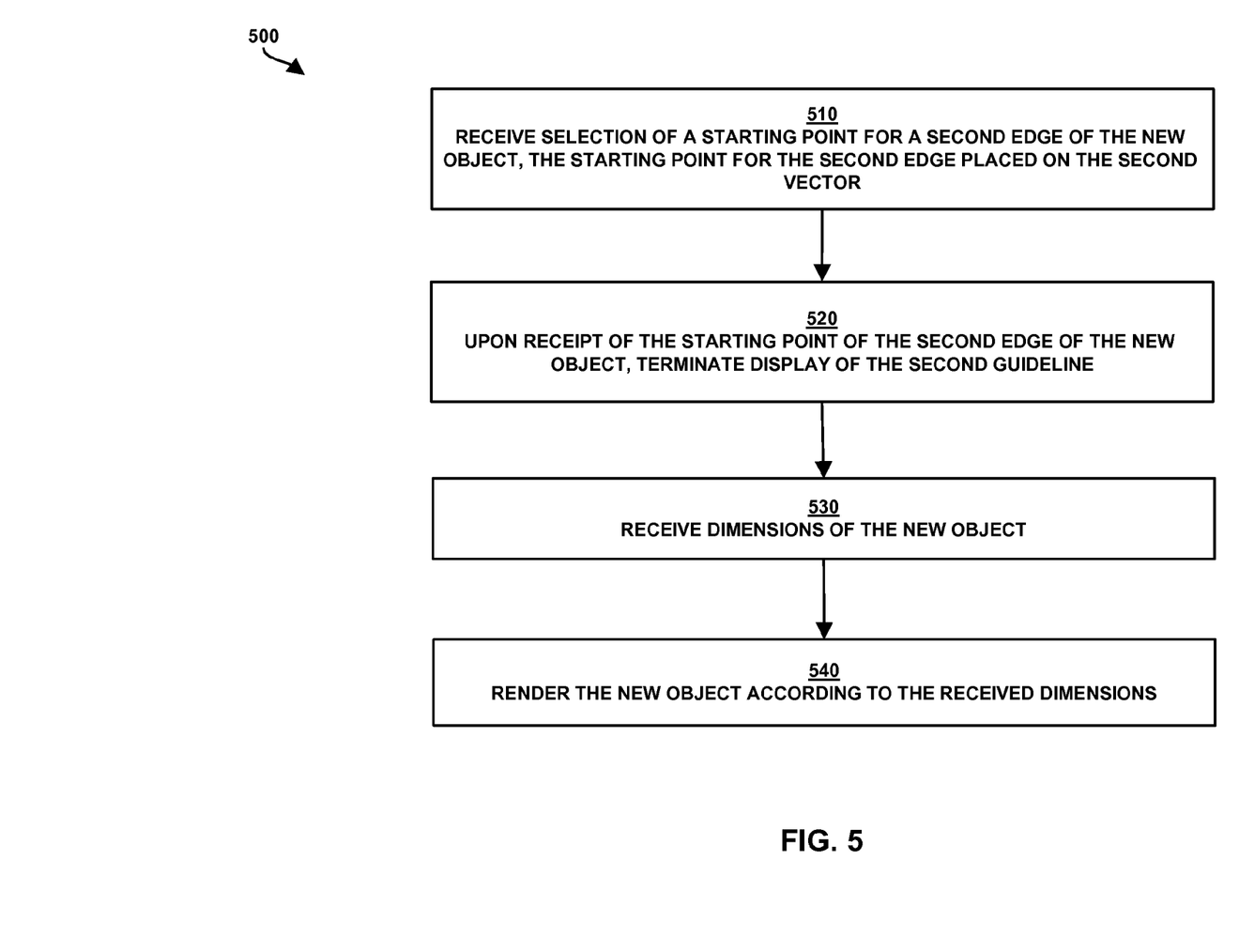
FIG. 5 is a flowchart of an example of processing steps performed by a perspective guide to receive dimensions of a new object after receiving selection of a starting point for a second edge of a new object according to embodiments herein.
Figure 6:
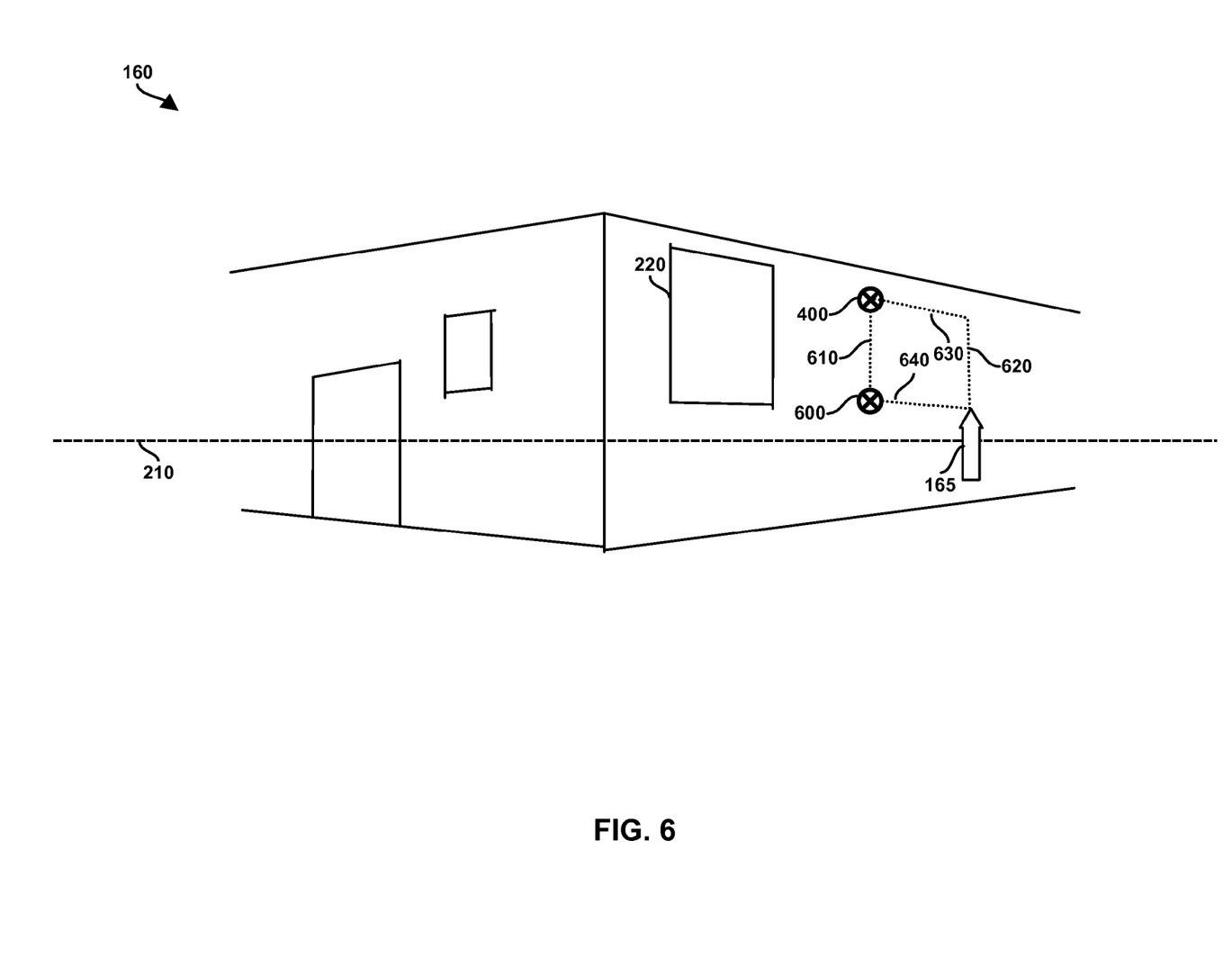
FIG. 6 is an example block diagram of a perspective guide receiving dimensions of a new object after terminating display of a second guideline according to embodiments herein.

FIG. 5 is a flowchart 500 of an example of processing steps performed by the perspective guide 150 to receive dimensions of a new object after receiving selection of a starting point for a second edge of a new object according to embodiments herein. The processing steps discussed in FIG. 5 relate generally to the block diagram illustrated in FIG. 6. FIG. 6 is an example block diagram of the perspective guide 150 receiving dimensions of a new object after terminating display of a second guideline according to embodiments herein.

At step 510, the perspective guide 150 receives selection of a starting point 600 for a second edge of the new object, where the starting point 600 for the second edge is placed on the second vector 450. For example, while displaying the second temporary guideline 420, the perspective guide 150 receives an input device operation, such as a mouse click. The perspective guide 150 determines the input device operation represents selection of the starting point 600 for the second edge of the new object relative to the current position of the graphical pointer 165. The second guideline end 460 at the time of the input device operation becomes the starting point 600 for the second edge of the new object.

At step 520, upon receipt of the starting point 600 of the second edge of the new object, the perspective guide 150 terminates display of the second guideline 420, but maintains display of the second guideline end 460 as the second edge's starting point 600.

At step 530, the perspective guide 150 receives dimensions of the new object. As the perspective guide 150 detects the graphical pointer being dragged away from the second starting point 600, the perspective guide 150 creates a preview of the new object with current dimensions displayed via an edge 630 that begins at the first starting point 400 and runs along the vector 250, angled (i.e. sloped) towards the vanishing point 200.

The preview of the new object includes an edge 640 that begins at the second starting point 600 and runs on the second vector 450 angled towards the vanishing point 200. The preview of the new object also includes as edge between the first starting point 400 and the second starting point 600 and an edge 620 connected between the endpoints of the two angled edges 630, 640.

At step 540, upon receiving a request to render the new object based on the current positions of the edges 610, 620, 630, 640 displayed in the preview of the new object, the perspective guide 150 renders the new object according to the received dimensions.

Figure 7:
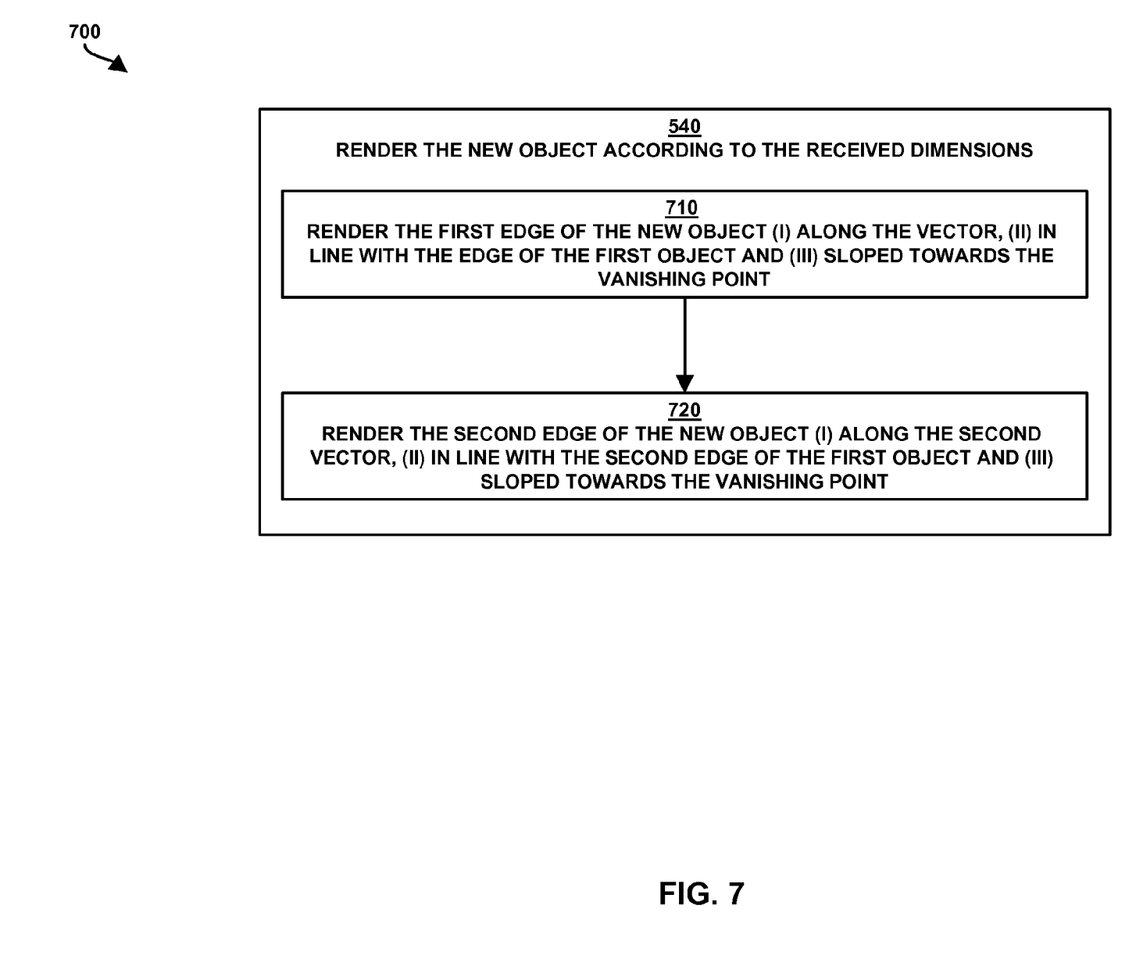
FIG. 7 is a flowchart of an example of processing steps performed by the perspective guide to render a new object according to received dimensions according to embodiments herein.
Figure 8:
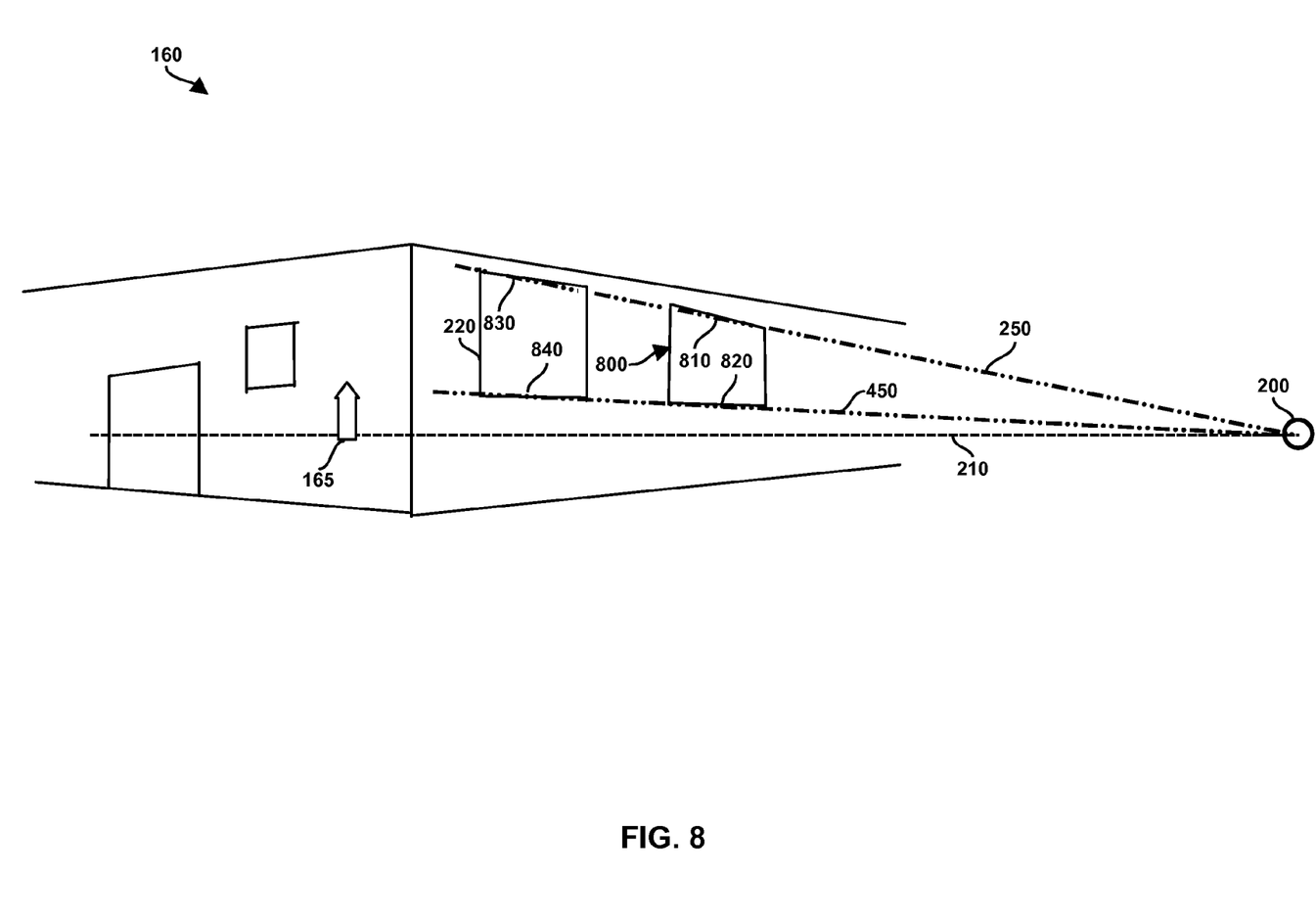
FIG. 8 is an example block diagram of a perspective guide rendering a new object with edges sloped towards a vanishing point according to embodiments herein.

FIG. 7 is a flowchart 700 of an example of processing steps performed by the perspective guide 150 to render a new object according to received dimensions according to embodiments herein. The processing steps discussed in FIG. 7 relate generally to the block diagram illustrated in FIG. 8. FIG. 8 is an example block diagram of a perspective guide 150 rendering a new object with edges sloped towards a vanishing point according to embodiments herein.

Upon receiving a request to render the new object 800, at step 710, the perspective guide 150 renders the first edge 810 of the new object 800 (i) along the vector 250, (ii) in line with an edge 830 of the first object 220 and (iii) sloped towards the vanishing point 200.

At step 720, the perspective guide 150 renders a second edge 820 of the new object 800 (i) along the second vector 450, (ii) in line with a second edge 840 of the first object 200 and (iii) sloped towards the vanishing point 200.

Figure 9:
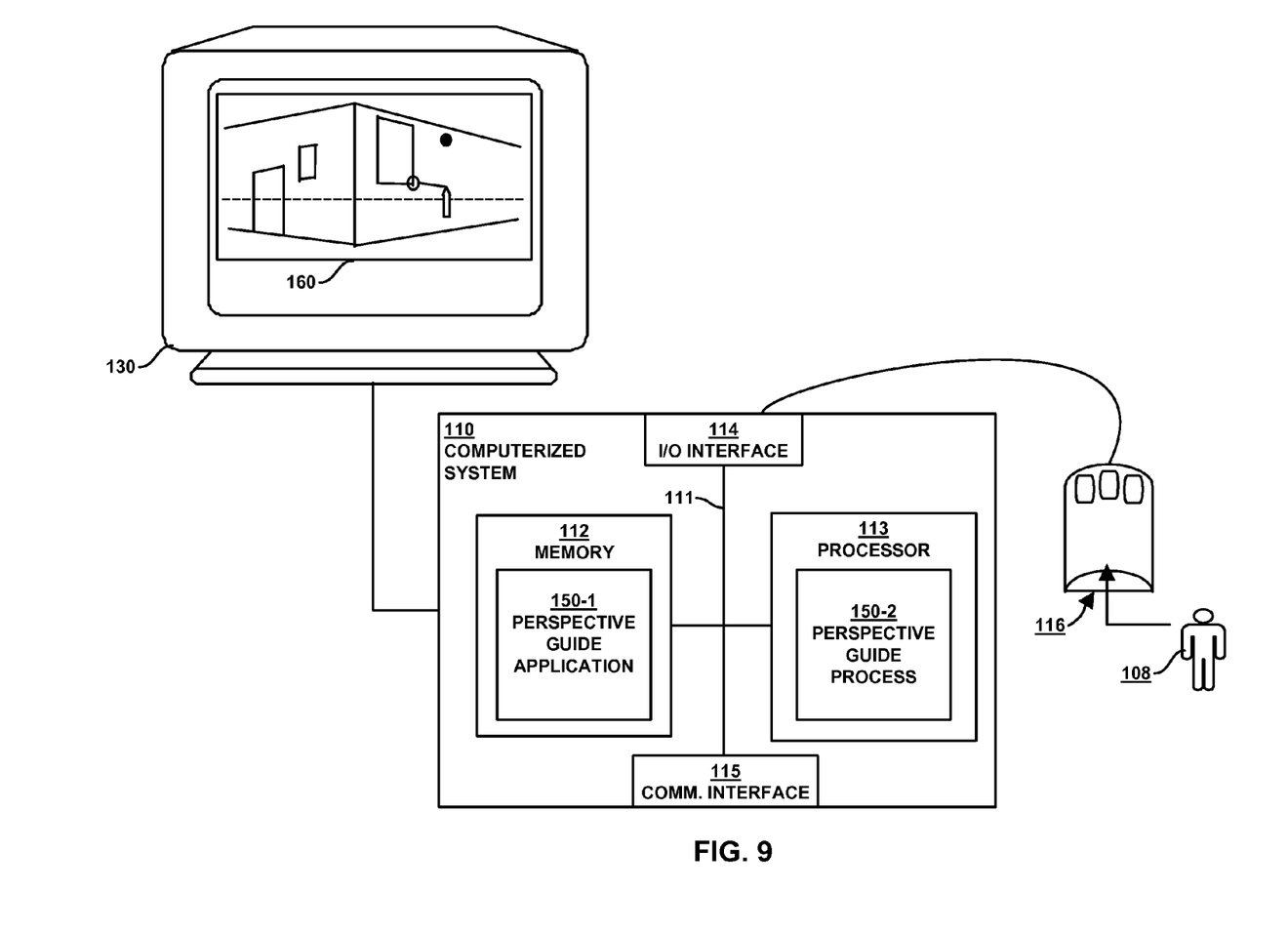
FIG. 9 is an example block diagram illustrating an architecture of a computer system that executes, runs, interprets, operates or otherwise performs a perspective guide application and/or perspective guide process according to embodiments herein.

FIG. 9 is an example block diagram illustrating an architecture of a computer system 110 that executes, runs, interprets, operates or otherwise performs a perspective guide application 150-1 and/or perspective guide process 150-2 (e.g. an executing version of a perspective guide 150 as controlled or configured by user 108) according to embodiments herein.

Note that the computer system 110 may be any type of computerized device such as a personal computer, a client computer system, workstation, portable computing device, console, laptop, network terminal, etc. This list is not exhaustive and is provided as an example of different possible embodiments.

In addition to a single computer embodiment, computer system 110 can include any number of computer systems in a network environment to carry the embodiments as described herein.

As shown in the present example, the computer system 110 includes an interconnection mechanism 111 such as a data bus, motherboard or other circuitry that couples a memory system 112, a processor 113, an input/output interface 114, and a display 130. If so configured, the display can be used to present a graphical user interface of the perspective guide 150 to user 108. An input device 116 (e.g., one or more user/developer controlled devices such as a keyboard, mouse, touch pad, etc.) couples to the computer system 110 and processor 113 through an input/output (I/O) interface 114. The computer system 110 can be a client system and/or a server system. As mentioned above, depending on the embodiment, the perspective guide application 150-1 and/or the perspective guide process 150-2 can be distributed and executed in multiple nodes in a computer network environment or performed locally on a single computer.

During operation of the computer system 110, the processor 113 accesses the memory system 112 via the interconnect 111 in order to launch, run, execute, interpret or otherwise perform the logic instructions of the perspective guide application 150-1. Execution of the perspective guide application 150-1 in this manner produces the perspective guide process 150-2. In other words, the perspective guide process 150-2 represents one or more portions or runtime instances of the perspective guide application 150-1 (or the entire application 150-1) performing or executing within or upon the processor 113 in the computerized device 110 at runtime.

The perspective guide application 150-1 may be stored on a computer readable medium (such as a floppy disk), hard disk, electronic, magnetic, optical, or other computer readable medium. It is understood that embodiments and techniques discussed herein are well suited for other applications as well.

Those skilled in the art will understand that the computer system 110 may include other processes and/or software and hardware components, such as an operating system. Display 130 need not be coupled directly to computer system 110. For example, the perspective guide application 150-1 can be executed on a remotely accessible computerized device via the communication interface 115.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), camera(s), camcorder(s), laptop(s), handheld computer(s), set top box(es) or another device(s) capable of being integrated with a processor(s) that may operate as provided herein. Accordingly, the devices provided herein are not exhaustive and are provided for illustration and not limitation.

References to "a processor", or "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A method comprising:
    identifying a first object displayed on a graphical user interface rendered on a display device, an edge of the first object including an anchor point, the anchor point positioned on a vector extending from at least one predefined vanishing point towards the anchor point, the predefined vanishing point placed in a perspective drawing on the graphical user interface;

associating a graphical pointer to the anchor point, the graphical pointer responsive to input from an input device and displayed on the graphical user interface; and drawing a new object relative to the anchor point on the graphical user interface while maintaining at least one edge of the new object in forced perspective alignment with the vector.

2. The method of claim 1, wherein associating a graphical pointer to the anchor point comprises:

detecting when the graphical pointer is positioned in proximity to the vector; and in response to detecting the graphical pointer's proximity to the vector, displaying a guideline aligned on the vector, the guideline extending between the anchor point and a guideline end, the guideline end being a position on the vector relative to a current position of the graphical pointer.

3. The method as in claim 2, wherein detecting when the graphical pointer is positioned in proximity to the vector comprises:

detecting a current position of the graphical pointer falls within a predefined range of distance from at least one graphical user interface coordinate positioned on the vector.

4. The method of claim 2, wherein drawing the new object relative to the anchor point comprises:

during display of the guideline, receiving selection of a starting point for an edge of the new object;

defining the starting point for the edge of the new object at the guideline end; and in response to defining the starting point for the edge of the new object, terminating display of the guideline.

5. The method of claim 4, wherein drawing new object comprises:

detecting movement of the graphical pointer away from the starting point for the edge of the new object;

in response to the movement away from the starting point, drawing a preview of the new object while maintaining the edge of the new object in alignment with the vector; and in response to a selection of a current preview of the new object, rendering the new object according to dimensions of the current preview.

6. The method as in claim 2, wherein drawing the new object relative to the anchor point comprises: upon receipt of a position of a first edge of the new object:

(i) terminating display of the guideline; and (ii) drawing a preview of the new object with the first edge of the new object rendered in alignment with the vector;

associating the graphical pointer to a second anchor point placed on a second edge of the first object while maintaining the starting point for the first edge of the new object at the guideline end, the second anchor point positioned on a second vector extending from the at least one predefined vanishing point towards the second anchor point;

detecting when the graphical pointer is positioned in proximity to the second vector; and in response to detecting the graphical pointer's proximity to the second vector, displaying a second guideline aligned on the second vector, the second guideline extending between the second anchor point and a second guideline end, the second guideline end being a position on the second vector relative to a current position of the graphical pointer.

7. The method as in claim 6, comprising:

receiving selection of a starting point for a second edge of the new object, the starting point for the second edge placed on the second vector;

upon receipt of the starting point of the second edge of the new object, terminating display of the second guideline;

receiving dimensions of the new object; and rendering the new object according to the received dimensions.

8. The method as in claim 7, wherein rendering the new object includes:

rendering the first edge of the new object (i) along the vector, (ii) in line with the edge of the first object and (iii) sloped towards the vanishing point; and rendering the second edge of the new object (i) along the second vector, (ii) in line with the second edge of the first object and (iii) sloped towards the vanishing point.

9. The method of claim 2, wherein displaying the guideline aligned on the vector comprises:

displaying the guideline as visually distinct from at least one edge characteristic of the first object, wherein the vector comprises a vector hidden from view on the graphical user interface; and upon receiving a request to reveal the vector, displaying the vector as visually distinct from (i) the guideline and (ii) the at least one edge characteristic of the first object.

10. The method of claim 1, wherein drawing the new object relative to the anchor point comprises:

receiving a position of an edge of the new object;

receiving dimensions of the new object;

rendering the new object according to the received dimensions; and displaying the edge of the new object along the vector, the edge of the new object comprising a portion of the vector angled towards the vanishing point.

11. The method of claim 10, wherein receiving dimensions of the new object includes: concurrently receiving temporary positions for multiple, remaining edges of the new object;

displaying a preview outline of the new object according to the temporary positions of the multiple, remaining edges of the new object; and upon receiving a desired position of a second edge of the new object, terminating display of the preview outline of the new object.

12. A non-transitory computer readable medium comprising executable instructions encoded thereon operable on a computerized device to perform processing comprising:

instructions for identifying a first object displayed on a graphical user interface rendered on a display device, an edge of the first object including an anchor point, the anchor point positioned on a vector extending from at least one predefined vanishing point towards the anchor point, the predefined vanishing point placed in a perspective drawing on the graphical user interface;

instructions for associating a graphical pointer to the anchor point, the graphical pointer responsive to input from an input device and displayed on the graphical user interface; and instructions for drawing a new object relative to the anchor point on the graphical user interface while maintaining at least one edge of the new object in forced perspective alignment with the vector.

13. The non-transitory computer readable medium of claim 12, wherein the instructions for associating a graphical pointer to the anchor point include:
- instructions for detecting when the graphical pointer is positioned in proximity to the vector; and
- instructions for displaying a guideline aligned on the vector, the guideline extending between the anchor point and a guideline end in response to detecting the graphical pointer's proximity to the vector, the guideline end being a position on the vector relative to a current position of the graphical pointer.

14. The non-transitory computer readable medium as in claim 13, wherein the instructions for detecting when the graphical pointer is positioned in proximity to the vector comprises selecting from a group comprising:
- instructions for detecting a current position of the graphical pointer falls within a predefined range of distance from at least one graphical user interface coordinate positioned on the vector.

15. The non-transitory computer readable medium of claim 13, wherein the instructions for drawing the new object relative to the anchor point include:
- instructions for receiving selection of a starting point for an edge of the new object during display of the guideline;
- instructions for defining the starting point for the edge of the new object at the guideline end; and
- instructions for terminating display of the guideline in response to defining the starting point for the edge of the new object.

16. The non-transitory computer readable medium of claim 15, wherein the instructions for drawing new object include:
- instructions for detecting movement of the graphical pointer away from the starting point for the edge of the new object;
- instructions for drawing a preview of the new object while maintaining the edge of the new object in alignment with the vector and in response to the movement away from the starting point; and
- instructions for rendering the new object according to dimensions of the current preview in response to a selection of a current preview of the new object.

17. The non-transitory computer readable medium as in claim 13, wherein the instructions for drawing the new object relative to the anchor point include:
- instructions for terminating display of the guideline upon receipt of a position of a first edge of the new object;
- instructions for drawing a preview of the new object with the first edge of the new object rendered in alignment with the vector;
- instructions for associating the graphical pointer to a second anchor point placed on a second edge of the first object while maintaining the starting point for the first edge of the new object at the guideline end, the second anchor point positioned on a second vector extending from the at least one predefined vanishing point towards the second anchor point;
- instructions for detecting when the graphical pointer is positioned in proximity to the second vector; and
- instructions for displaying a second guideline aligned on the second vector in response to detecting the graphical pointer's proximity to the second vector, the second guideline extending between the second anchor point and a second guideline end, the second guideline end being a position on the second vector relative to a current position of the graphical pointer.

18. The non-transitory computer readable medium as in claim 17, comprising:
- instructions for receiving selection of a starting point for a second edge of the new object, the starting point for the second edge placed on the second vector;
- instructions for terminating display of the second guideline upon receipt of the starting point of the second edge of the new object;
- instructions for receiving dimensions of the new object; and
- instructions for rendering the new object according to the received dimensions.

19. The non-transitory computer readable medium as in claim 18, wherein the instructions for rendering the new object include:
- instructions for rendering the first edge of the new object (i) along the vector, (ii) in line with the edge of the first object and (iii) sloped towards the vanishing point; and
- instructions for rendering the second edge of the new object (i) along the second vector, (ii) in line with the second edge of the first object and (iii) sloped towards the vanishing point.

20. A computer system comprising:
- a processor;
- a memory unit that stores instructions associated with an application executed by the processor; and
- an interconnect coupling the processor and the memory unit, enabling the computer system to execute the application and perform operations of:
- identifying a first object displayed on a graphical user interface rendered on a display device, an edge of the first object including an anchor point, the anchor point positioned on a vector extending from at least one predefined vanishing point towards the anchor point, the predefined vanishing point placed in a perspective drawing on the graphical user interface;
- associating a graphical pointer to the anchor point, the graphical pointer responsive to input from an input device and displayed on the graphical user interface; and
- drawing a new object relative to the anchor point on the graphical user interface while maintaining at least one edge of the new object in forced perspective alignment with the vector.

* * * * *